Patented Apr. 25, 1939

2,155,861

UNITED STATES PATENT OFFICE 2,155,861

DUPLICATING INK AND METHOD OF MAKING THE SAME

William Jonse Hughes, Brooklyn, N. Y., assignor to Manifold Supplies Company, Brooklyn, N. Y., a corporation of New York No Drawing. Application January 15, 1936, Serial No. 59,313

4 Claims. (Cl. 134—31)

The present invention relates to an improvement in duplicating inks and methods of making the same. One object thereof has been to provide a duplicating ink or composition which will produce black copies of written or printed records or the like in connection with the use of well known duplicating or multiplying methods wherein the markings in ink or colored composition forming the matter to be copied or multiplied are printed, impressed, deposited or stencilled upon a suitable master sheet or record. In making copies from such master sheets or records, the deposits or markings of soluble ink thereon are moistened by application of a suitable solvent and prints are made by contacting fresh sheets with said moistened ink markings according to various methods in general practice such as the Ditto or Hectograph process which employs an aqueous solvent supplied by moistened gelatin compound, or by contacting said ink markings or master matter with fresh sheets previously moistened with some solvent such as water for the copying machine process or spirit solutions for the spirit process which is exemplified in Ritzerfeld's Patent No. 1,645,930 or in Storck's Patent No. 1,964,933.

To obtain the substantially black prints or copies above referred to, I use as the soluble coloring ingredient in my composition a mixture of the dyes, crystal violet (salt of hexamethyl-pararosaniline), brilliant or ethyl green (salt of tetraethyl diamidotriphenyl-carbinol), magenta (mixture of pararosaniline and rosaniline), and chrysoidine (salt of diamido azo benzene). The above ingredients in finely divided condition are mixed with a suitable vehicle or medium in such proportions that their combined effect is to produce copies of a black hue when used in duplicating processes as above explained.

A preferred embodiment of my duplicating compoistion includes a dye content consisting of a mixture of the aforesaid dyes in relative amounts as follows:

| | Pounds |
|---|---|
| Crystal violet | 11 |
| Brilliant or ethyl green | 13½ |
| Magenta | 5 |
| Chrysoidine | 15½ |
| | 45 |

The foregoing formula or composition of dyes is used as the coloring agent in my improved duplicating inks to produce black copies, although the medium or vehicle for the dyes will vary to fit different adaptations or conditions of use. For example, where the carrier is in the form of a sheet, as of so-called carbon paper, the ink composition is employed as a coating thereon.

In the case of a typewriter ribbon or the like, the fabric base is impregnated with the composition; and where the master sheet or record is to be printed, as from type or plates, the composition is in the form of a printing ink. Those embodiments of my invention more particularly adapted for use as ribbon inks and printing inks respectively form the subject matter of my copending application Serial No. 59,314, filed January 15, 1936.

To make my ink composition in the form of a coating material for carbon sheets, I mix said dye content with a suitable quantity of an appropriate medium, one example of which includes ingredients as follows:

| | Pounds |
|---|---|
| Beeswax | 4 |
| Oleo stearine | 6 |
| Mutton tallow | 26 |
| Lard oil | 4 |
| Total | 40 |

It is contemplated that oily or greasy substances other than those above specified, such as carnauba wax for example, with additional lard oil may be substituted in proper amount for the oleo stearine, and mutton tallow. For the purposes of my invention, an appropriate medium for the carbon paper coating composition is one comprising waxy and oily substances having when mixed a melting point sufficiently low to avoid harmful effect on the dye content either in the process of manufacture or in coating, and high enough to permit normal use of the coated or carbon sheets under weather conditions involving summer or near tropical heat. It has been found that said dyes or portions thereof may tend to coagulate or coke in rigid or only slightly plastic masses where the melting point of the medium is substantially in excess of 138° F. This result renders the mixture of dye and medium incapable of being satisfactorily spread or coated upon the carrier or carbon sheets. It is therefore important that the medium to be used with the dyes above specified to produce a coating material have a melting point not substantially higher than 138° F.

In the above specific example of an ink suitable for carbon paper coating, the ratio of dyes to medium is about 55% dyes to 45% medium.

It will be understood, however, that this represents an average or mean ratio of medium to dyes which may be varied widely depending on the character or effectiveness of the solvent to be employed in the duplicating operations, or on the character of the desired or intended results.

Previous efforts to provide a commercially satisfactory carbon paper for making multiple copies in a black hue have failed in part because the coating inks on said papers have not produced uniformly black prints or copies, and different prints from the same sheet came off in different colors, as in blue, green or purplish tints. Carbon papers, coated with the duplicating ink according to my invention will uniformly produce commercially acceptable copies of substantially black color.

One effective method of making the above described ink or coating composition is to melt the beeswax and then add the oleo stearine, mutton tallow and lard oil, or other suitable greasy or oily substances. This mixture is cooled; or, having been previously mixed and cooled, is re-heated to approximately 138° F. and the dyes are added thereto. The assembled ingredients including the dye composition are now thoroughly ground to a uniform paste-like mass wherein the dyes in minute particles are intimately dispersed and form in effect a soluble black color. This mass or ink composition flows sufficiently for coating on a sheet of paper or the like at a temperature around 138° F., care being taken to avoid heating it above the temperature at which the undesirable coking or coagulation previously referred to is likely to occur. When so melted and in sufficiently liquid condition, it is flowed, or otherwise applied as a coating on a sheet or other suitable carrier.

In ultimate use, portions of this coating when cool are transferred, deposited or stencilled from the carrier or carbon sheet to form the record on a master sheet or the like according to well known practice.

One such master sheet will make a commercially acceptable number of copies all of which will be substantially uniformly of a black hue, as contrasted with copies made from known so-called black inks which, in the copying process, produce varying tints of green, purple, blue, etc. according to their composition.

I claim:

1. A duplicating ink comprising a mixture of dyes including chrysoidine, brilliant green, magenta and crystal violet in relative proportions to form a soluble coloring agent which, when employed in making multiple copies, produces copies or prints of substantially black hue, and an oil and wax medium having a melting point not substantially in excess of 138° F. and in which said dyes are dispersed in finely divided condition.

2. A duplicating ink comprising a mixture of dyes including chrysoidine, brilliant green, magenta, crystal violet and an oil and wax medium having a melting point not substantially in excess of 138° F. and in which said dyes are dispersed in finely divided condition.

3. A duplicating ink comprising a mixture of dyes in proportionate amounts as follows—crystal violet 11 pounds, brilliant green 13½ pounds, magenta 5 pounds, chrysoidine 15½ pounds and a medium including a mixture of ingredients in proportionate amounts as follows—beeswax 4 pounds, oleo stearine 6 pounds, mutton tallow 26 pounds, lard oil 4 pounds.

4. An ink composition comprising ingredients in approximate proportions by weight as follows: beeswax 4.4%, oleo stearine 4.4%, mutton tallow 26.7%, lard oil 8.9%, crystal violet 13.3%, brilliant green 16.7%, magenta 6.7% and chrysoidine 18.9%.

WILLIAM JONSE HUGHES.

---

CERTIFICATE OF CORRECTION.

Patent No. 2,155,861.   April 25, 1939.

WILLIAM JONSE HUGHES.

It is hereby certified that error appears in the printed specification of the above numbered patent requiring correction as follows: Page 1, second column, line 44, for the words "melting point" read temperature; and that the said Letters Patent should be read with this correction therein that the same may conform to the record of the case in the Patent Office.

Signed and sealed this 11th day of July, A.D. 1939.

(Seal)   Acting Commissioner of Patents.   Henry Van Arsdale

It will be understood, however, that this represents an average or mean ratio of medium to dyes which may be varied widely depending on the character or effectiveness of the solvent to be employed in the duplicating operations, or on the character of the desired or intended results.

Previous efforts to provide a commercially satisfactory carbon paper for making multiple copies in a black hue have failed in part because the coating inks on said papers have not produced uniformly black prints or copies, and different prints from the same sheet came off in different colors, as in blue, green or purplish tints. Carbon papers, coated with the duplicating ink according to my invention will uniformly produce commercially acceptable copies of substantially black color.

One effective method of making the above described ink or coating composition is to melt the beeswax and then add the oleo stearine, mutton tallow and lard oil, or other suitable greasy or oily substances. This mixture is cooled; or, having been previously mixed and cooled, is re-heated to approximately 138° F. and the dyes are added thereto. The assembled ingredients including the dye composition are now thoroughly ground to a uniform paste-like mass wherein the dyes in minute particles are intimately dispersed and form in effect a soluble black color. This mass or ink composition flows sufficiently for coating on a sheet of paper or the like at a temperature around 138° F., care being taken to avoid heating it above the temperature at which the undesirable coking or coagulation previously referred to is likely to occur. When so melted and in sufficiently liquid condition, it is flowed, or otherwise applied as a coating on a sheet or other suitable carrier.

In ultimate use, portions of this coating when cool are transferred, deposited or stenciled from the carrier or carbon sheet to form the record on a master sheet or the like according to well known practice.

One such master sheet will make a commercially acceptable number of copies all of which will be substantially uniformly of a black hue, as contrasted with copies made from known so-called black inks which, in the copying process, produce varying tints of green, purple, blue, etc. according to their composition.

I claim:

1. A duplicating ink comprising a mixture of dyes including chrysoidine, brilliant green, magenta and crystal violet in relative proportions to form a soluble coloring agent which, when employed in making multiple copies, produces copies or prints of substantially black hue, and an oil and wax medium having a melting point not substantially in excess of 138° F. and in which said dyes are dispersed in finely divided condition.

2. A duplicating ink comprising a mixture of dyes including chrysoidine, brilliant green, magenta, crystal violet and an oil and wax medium having a melting point not substantially in excess of 138° F. and in which said dyes are dispersed in finely divided condition.

3. A duplicating ink comprising a mixture of dyes in proportionate amounts as follows—crystal violet 11 pounds, brilliant green 13½ pounds, magenta 5 pounds, chrysoidine 15½ pounds and a medium including a mixture of ingredients in proportionate amounts as follows—beeswax 4 pounds, oleo stearine 6 pounds, mutton tallow 26 pounds, lard oil 4 pounds.

4. An ink composition comprising ingredients in approximate proportions by weight as follows: beeswax 4.4%, oleo stearine 4.4%, mutton tallow 26.7%, lard oil 8.9%, crystal violet 13.3%, brilliant green 16.7%, magenta 6.7% and chrysoidine 18.9%.

WILLIAM JONSE HUGHES.

---

CERTIFICATE OF CORRECTION.

Patent No. 2,155,861. April 25, 1939.

WILLIAM JONSE HUGHES.

It is hereby certified that error appears in the printed specification of the above numbered patent requiring correction as follows: Page 1, second column, line 44, for the words "melting point" read temperature; and that the said Letters Patent should be read with this correction therein that the same may conform to the record of the case in the Patent Office.

Signed and sealed this 11th day of July, A.D. 1939.

(Seal) Henry Van Arsdale
Acting Commissioner of Patents.